(12) United States Patent
Wang et al.

(10) Patent No.: US 10,809,020 B2
(45) Date of Patent: Oct. 20, 2020

(54) LIQUID-COOLED COOLING DEVICE WITH GROOVES AND A COVER FORMING A CHANNEL

(71) Applicant: Surpass World Technology Co., Ltd., Taichung (TW)

(72) Inventors: Wen-Teng Wang, Huwei Township, Yunlin County (TW); Ting-Chih Ku, Taichung (TW)

(73) Assignee: Surpass World Technology Co., Ltd., Taichung (TW)

( * ) Notice: Subject to any disclaimer, the term of this patent is extended or adjusted under 35 U.S.C. 154(b) by 18 days.

(21) Appl. No.: 15/969,045

(22) Filed: May 2, 2018

(65) Prior Publication Data

US 2018/0320998 A1    Nov. 8, 2018

(30) Foreign Application Priority Data

May 3, 2017   (TW) .............................. 106114633 A

(51) Int. Cl.
*F28F 13/12* (2006.01)
*H02K 5/18* (2006.01)
*H02K 5/20* (2006.01)

(52) U.S. Cl.
CPC .............. *F28F 13/12* (2013.01); *H02K 5/18* (2013.01); *H02K 5/20* (2013.01)

(58) Field of Classification Search
CPC .. F28F 13/12; H02K 5/20; H02K 5/18; H02K 9/19

See application file for complete search history.

(56) References Cited

U.S. PATENT DOCUMENTS

| | | | | |
|---|---|---|---|---|
| 2,674,104 A | * | 4/1954 | Street ...................... | F28F 13/12 62/69 |
| 2,831,662 A | * | 4/1958 | Hirsch ...................... | H02K 5/20 165/156 |
| 3,009,072 A | * | 11/1961 | Mossay ..................... | H02K 9/19 310/57 |
| 3,075,103 A | * | 1/1963 | Ward, Jr. ................. | H02K 9/19 310/54 |
| 3,205,147 A | * | 9/1965 | Foure ....................... | G21C 3/30 376/399 |

(Continued)

FOREIGN PATENT DOCUMENTS

| CN | 202076876 U | 12/2011 |
|---|---|---|
| GB | 766951 A | 1/1957 |

(Continued)

*Primary Examiner* — Ljijana V. Ciric
(74) *Attorney, Agent, or Firm* — Muncy, Geissler, Olds & Lowe, P.C.

(57) ABSTRACT

A liquid-cooled cooling device with a channel includes a base a cover unit which is a cylindrical tube sleeved onto the surface of the base. The base has a surface which a groove is concavely disposed on, with a spoiler disposed on a portion of a wall of the groove and extending for a predetermined length in an axial direction of the groove. The cover unit covers the groove and thereby forms a channel which a liquid passes through, with the channel not completely closed by the spoiler. One of the base and the cover unit has a liquid inlet and a liquid outlet. The liquid inlet is in communication with one end of the channel. The liquid outlet is in communication with the other end of the channel.

9 Claims, 6 Drawing Sheets

(56) References Cited

U.S. PATENT DOCUMENTS

| | | | | |
|---|---|---|---|---|
| 3,457,982 A * | 7/1969 | Sephton | C02F 1/08 | 159/13.2 |
| 3,521,094 A * | 7/1970 | Helmut | H02K 9/19 | 310/58 |
| 3,577,024 A * | 5/1971 | Inagaki | H02K 9/19 | 310/54 |
| 3,831,672 A * | 8/1974 | Battisti | F28F 9/0234 | 165/154 |
| 3,887,004 A * | 6/1975 | Beck | F28F 1/42 | 165/179 |
| 3,916,231 A * | 10/1975 | Cathey | H02K 15/125 | 310/62 |
| 4,465,946 A * | 8/1984 | Springer | H02K 5/18 | 310/426 |
| 4,684,835 A * | 8/1987 | Kline, Jr. | H02K 9/06 | 310/40.5 |
| 4,943,746 A * | 7/1990 | Scherzinger | H02K 9/19 | 310/269 |
| 5,019,737 A | 5/1991 | Bruno | | |
| 5,263,267 A * | 11/1993 | Buttner | F26B 17/20 | 34/179 |
| 5,311,090 A * | 5/1994 | Ferlatte | H02K 5/10 | 310/88 |
| 5,575,615 A * | 11/1996 | Mohn | F04D 1/00 | 415/74 |
| 5,623,175 A * | 4/1997 | Ronning | H02K 5/20 | 123/41.31 |
| 5,626,156 A * | 5/1997 | Vicory, Sr. | A45D 2/10 | 132/229 |
| 5,698,913 A * | 12/1997 | Yagi | B61C 9/46 | 105/53 |
| 5,731,643 A * | 3/1998 | Avakian | B60L 50/30 | 310/53 |
| 5,747,900 A * | 5/1998 | Nakamura | H02K 9/14 | 310/58 |
| 5,852,865 A * | 12/1998 | Kirtley, Jr. | H02K 5/20 | 29/596 |
| 5,901,568 A * | 5/1999 | Haga | F25B 3/00 | 62/324.6 |
| 6,617,715 B1 * | 9/2003 | Harris | H02K 5/20 | 123/41.31 |
| 6,822,353 B2 * | 11/2004 | Koga | F28D 1/035 | 310/52 |
| 7,669,348 B2 * | 3/2010 | Christy | F26B 11/16 | 110/246 |
| 8,080,909 B2 * | 12/2011 | Perkins | B60K 6/48 | 310/52 |
| 8,134,246 B1 * | 3/2012 | Lois | F03D 9/34 | 290/44 |
| 8,414,690 B2 * | 4/2013 | Hansen | B01D 53/0438 | 95/115 |
| 9,226,560 B1 * | 1/2016 | Birk | A45D 2/367 | |
| 9,397,536 B2 * | 7/2016 | Cimatti | H02K 9/19 | |
| 9,467,030 B2 * | 10/2016 | Camilleri | H02K 15/14 | |
| 9,819,247 B2 * | 11/2017 | Leberle | H02K 5/20 | |
| 10,060,682 B2 * | 8/2018 | Rippel | F28F 1/025 | |
| 10,454,338 B2 * | 10/2019 | Jung | H02K 5/20 | |
| 2002/0070288 A1 * | 6/2002 | Bouti | B29C 45/2806 | 239/135 |
| 2003/0070788 A1 * | 4/2003 | Dierbeck | F28D 1/05366 | 165/41 |
| 2003/0173839 A1 * | 9/2003 | Torii | H02K 11/33 | 310/52 |
| 2004/0103639 A1 * | 6/2004 | Haggander | F28F 13/12 | 60/267 |
| 2006/0066155 A1 * | 3/2006 | Matin | H02K 5/136 | 310/52 |
| 2007/0023163 A1 * | 2/2007 | Kidwell | F28D 15/0233 | 165/45 |
| 2008/0017354 A1 * | 1/2008 | Neal | H01F 27/10 | 165/104.14 |
| 2008/0067882 A1 * | 3/2008 | Murata | H02K 9/19 | 310/54 |
| 2008/0169088 A1 * | 7/2008 | Aoki | H01L 23/473 | 165/104.19 |
| 2008/0179972 A1 * | 7/2008 | Aoki | H01L 21/4878 | 310/52 |
| 2008/0284263 A1 * | 11/2008 | Dessirier | H02K 5/20 | 310/54 |
| 2009/0127946 A1 * | 5/2009 | Fee | H02K 5/20 | 310/64 |
| 2009/0250200 A1 * | 10/2009 | Kidwell | F25B 30/06 | 165/154 |
| 2010/0085706 A1 * | 4/2010 | Savant | H02K 5/20 | 361/689 |
| 2010/0102647 A1 * | 4/2010 | Savant | H02K 5/20 | 310/52 |
| 2010/0154772 A1 * | 6/2010 | Harris | F24V 40/00 | 126/247 |
| 2010/0244595 A1 * | 9/2010 | Sheth | E21B 43/128 | 310/54 |
| 2011/0150689 A1 * | 6/2011 | Ree | F04C 2/1071 | 418/55.1 |
| 2011/0240267 A1 * | 10/2011 | Blanc | F28F 13/06 | 165/109.1 |
| 2012/0001503 A1 * | 1/2012 | Owng | H02K 9/14 | 310/54 |
| 2012/0024610 A1 * | 2/2012 | Woolmer | H02K 9/20 | 180/65.51 |
| 2012/0045356 A1 * | 2/2012 | Nachtergaele | F04C 29/0042 | 418/55.1 |
| 2012/0318479 A1 | 12/2012 | Chang et al. | | |
| 2013/0263898 A1 * | 10/2013 | Takei | B08B 3/04 | 134/157 |
| 2014/0020867 A1 * | 1/2014 | Moruzzi | H01L 23/473 | 165/104.19 |
| 2014/0069099 A1 * | 3/2014 | Rohwer | H02K 5/20 | 60/714 |
| 2014/0232217 A1 * | 8/2014 | Miyama | H02K 9/22 | 310/52 |
| 2014/0246177 A1 * | 9/2014 | Chamberlin | H02K 9/19 | 165/104.33 |
| 2014/0246931 A1 * | 9/2014 | Chamberlin | H02K 5/20 | 310/54 |
| 2014/0246932 A1 * | 9/2014 | Chamberlin | H02K 5/20 | 310/54 |
| 2014/0246933 A1 * | 9/2014 | Chamberlin | H02K 9/19 | 310/54 |
| 2014/0354089 A1 * | 12/2014 | Chamberlin | H02K 9/19 | 310/54 |
| 2014/0361649 A1 * | 12/2014 | Chong | H02K 9/22 | 310/54 |
| 2015/0013949 A1 * | 1/2015 | Arnot | F28F 13/12 | 165/156 |
| 2015/0048700 A1 * | 2/2015 | Liu | H02K 5/20 | 310/54 |
| 2015/0159957 A1 * | 6/2015 | Baxi | F28F 13/12 | 165/109.1 |
| 2016/0028292 A1 * | 1/2016 | Lin | H02K 5/20 | 310/64 |
| 2016/0045946 A1 * | 2/2016 | Chyou | F28D 20/00 | 165/10 |
| 2016/0141921 A1 * | 5/2016 | Kubes | H02K 9/19 | 310/54 |
| 2016/0276906 A1 * | 9/2016 | Morrison | H02K 9/19 | |
| 2017/0074083 A1 * | 3/2017 | Morton | E21B 43/38 | |
| 2017/0328280 A1 * | 11/2017 | Hussain | F02C 7/185 | |
| 2017/0346371 A1 * | 11/2017 | Gruetzner | H02K 1/32 | |
| 2018/0013325 A1 * | 1/2018 | Jakob | H02K 5/24 | |
| 2018/0094869 A1 * | 4/2018 | Reshetnyak | F28F 9/001 | |
| 2019/0011190 A1 * | 1/2019 | Kolb | F28D 7/0066 | |
| 2019/0013717 A1 * | 1/2019 | Li | H02K 1/32 | |
| 2019/0027987 A1 * | 1/2019 | Frohlich | H02K 17/16 | |

(56) References Cited

U.S. PATENT DOCUMENTS

2019/0165633 A1\* 5/2019 Gu .......................... H02K 5/18
2020/0116439 A1\* 4/2020 Chan ...................... F28F 13/12

FOREIGN PATENT DOCUMENTS

| GB | 2535975 A | \* | 9/2016 |
| JP | H10-155257 A | | 6/1998 |
| JP | 2004-194362 A | | 7/2004 |
| JP | 3178387 U | | 8/2012 |
| KR | 10-2009-0073789 A | | 7/2009 |
| TW | 200826435 A | | 6/2008 |
| TW | I487251 B | | 6/2015 |

\* cited by examiner

LIQUID-COOLED COOLING DEVICE WITH GROOVES AND A COVER FORMING A CHANNEL

BACKGROUND OF THE INVENTION

1. Technical Field

The present disclosure relates to technology of effecting liquid-cooled cooling by channels and, more particularly, to a liquid-cooled cooling device with a channel having therein spoilers for enhancing cooling efficiency.

2. Description of Related Art

Efficiency of liquid-cooled cooling is enhanced by a channel according to the prior art. For example, Taiwan patent 200826435 discloses a cooling system that includes a motor or driving shaft designed to reduce manufacturing costs and surrounded by a cooling pipe and effects cooling with a cooling liquid which is fed to the cooling pipe to circulate therein. Taiwan patent I487251 discloses a motor with a casing having a heat-dissipating inner channel, characterized in that the inner channel is embedded in the wall of the casing and adapted to admit a cooling liquid, thereby effecting cooling.

As revealed above, conventional liquid-cooled cooling device design attaches great importance to the mere presence of a channel in a liquid-cooled cooling device but does not make improvement to the channel's internal structure which is otherwise required for enhancement of cooling efficiency.

BRIEF SUMMARY OF THE INVENTION

It is an objective of the present disclosure to provide a liquid-cooled cooling device with a channel, characterized in that spoilers in the channel are effective in varying the flow of a cooling liquid in the channel and thus enable the cooling liquid to absorb more heat, such that circulation of the cooling liquid is conducive to removal of heat, thereby enhancing cooling efficiency.

Another objective of the present disclosure is to provide a liquid-cooled cooling device with a channel, characterized in that spoilers in the channel are effective in increasing the contact area between the channel's wall and the cooling liquid and thus enable the cooling liquid to absorb heat readily, such that circulation of the cooling liquid is conducive to removal of heat, thereby enhancing cooling efficiency.

In order to achieve the above and other objectives, the present disclosure provides a liquid-cooled cooling device with a channel, comprising: a base having a surface which a slender groove is concavely disposed on, with a spoiler disposed on a portion of a wall of the groove and extending for a predetermined length in an axial direction of the groove; and a cover unit coveringly disposed at the base to cover the groove and thereby form a channel which a liquid passes through, with the channel not completely closed by the spoiler, wherein one of the base and the cover unit has a liquid inlet and a liquid outlet, the liquid inlet being in communication with an end of the channel, and the liquid outlet being in communication with another end of the channel. Therefore, spoilers in the channel are effective in varying the flow of a cooling liquid in the channel and increasing the contact area between the channel's wall and the cooling liquid, thereby enhancing cooling efficiency.

DETAILED DESCRIPTION OF THE INVENTION

Technical features of the present disclosure are hereunder illustrated with preferred embodiments in conjunction with the accompanying drawings and described below.

Figure 1:
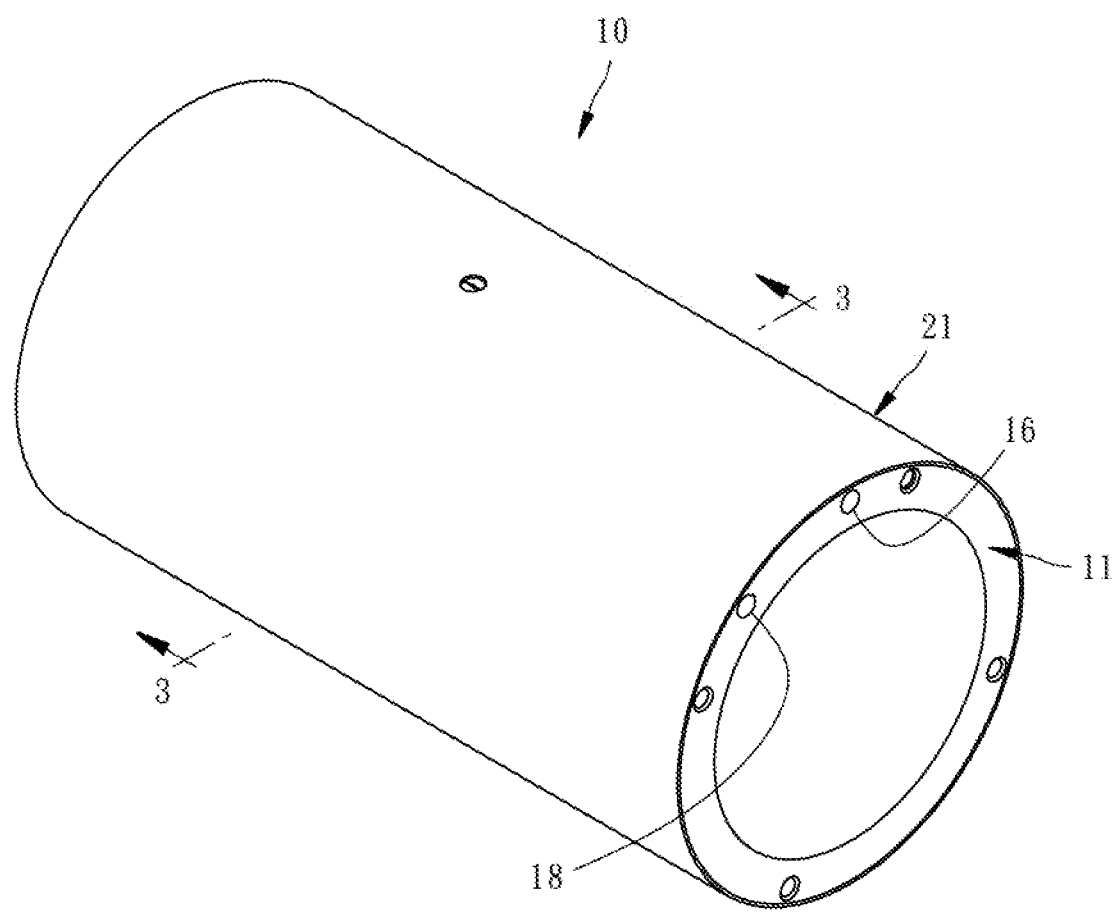
FIG. 1 is a perspective view of an assembled liquid-cooled cooling device with a channel according to the first preferred embodiment of the present disclosure.
Figure 2:
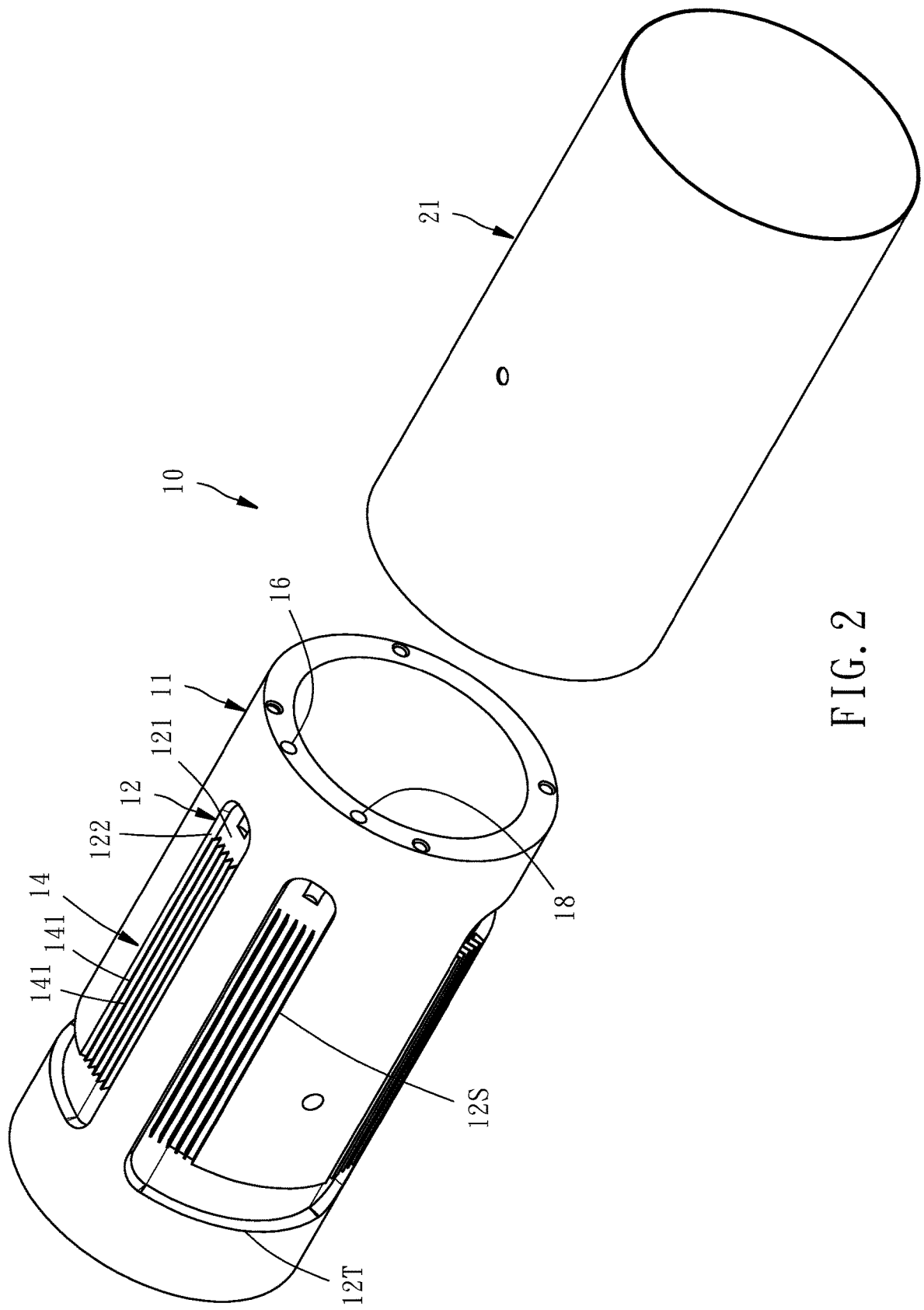
FIG. 2 is an exploded view of the liquid-cooled cooling device with a channel according to the first preferred embodiment of the present disclosure.
Figure 3:
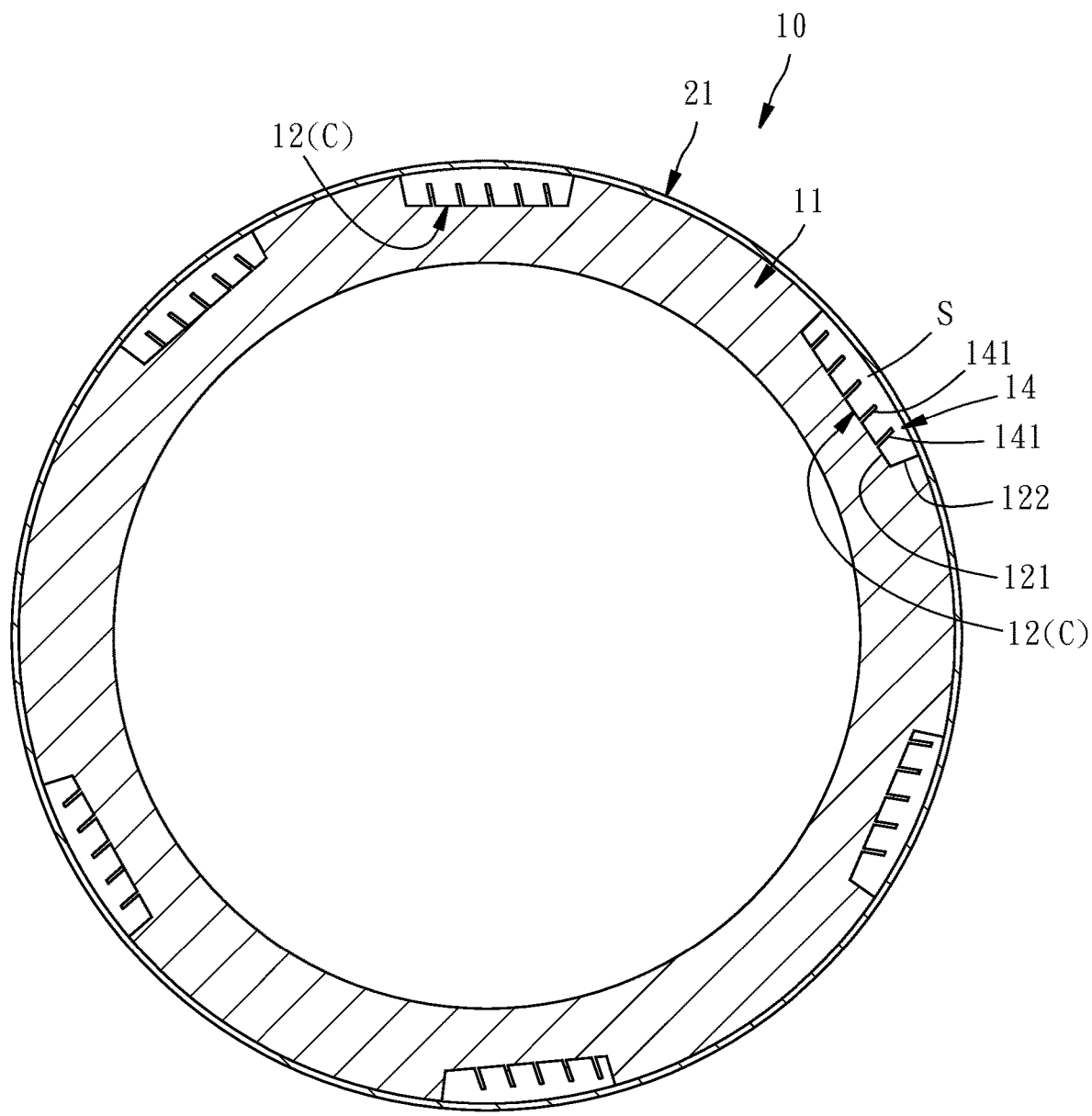
FIG. 3 is a cross-sectional view of the liquid-cooled cooling device with a channel taken along line 3-3 of FIG. 1.

Referring to FIG. 1 through FIG. 3, in the first preferred embodiment of the present disclosure, a liquid-cooled cooling device 10 with a channel essentially comprises a base 11 and a cover unit 21.

In the first embodiment, the base 11 is exemplified by a driving shaft of a machine tool. A slender groove 12 is concavely disposed on the surface of the base 11. The groove 12 has a bottom wall 121 and two sidewalls 122. The groove 12 extends across the surface of the base 11 by following a path that consists of alternately forward and backward S-shaped curves; hence, the groove 12 comprises a plurality of longitudinal segments 12S parallel to the axis of the base 11 and a plurality of transverse segments 12T perpendicular to the axis of the driving shaft. The plurality of longitudinal segments 12S each have therein a spoiler 14 in such a manner that the locations of the spoilers 14 are restricted to the bottom wall 121. The spoilers 14 extend in the axial direction of the groove 12.

The cover unit 21 is coveringly disposed at the base 11 and covers the groove 12 to therefore form a channel C which a liquid passes through. The plurality of spoilers 14 do not close the channel C completely. A cooling liquid 99 (shown in FIG. 4) passes through the channel C. In practice, the plurality of spoilers 14 are spaced apart from the cover unit 21 by a predetermined distance to form a space S. The cooling liquid 99 passes through the channel C by passing the plurality of spoilers 14 and passing through the space S. Owing to the space S, the cooling liquid 99 passes through the channel C without encountering any hindrance. If the space S is absent, the cooling liquid 99 passing the plurality of spoilers 14 in order to pass through the channel C will be subjected to resistance and thus can only pass the plurality of spoilers 14 slowly.

The base 11 has a liquid inlet 16 and a liquid outlet 18. The liquid inlet 16 is in communication with one end of the channel C. The liquid outlet 18 is in communication with the other end of the channel C. In a variant embodiment of the present disclosure, the liquid inlet 16 and the liquid outlet 18 are disposed on the cover unit 21 and are in communication with the two ends of the channel C, respectively. By contrast, in the first embodiment, the liquid inlet 16 and the liquid outlet 18 are disposed on the base 11. The cooling liquid 99 enters the liquid inlet 16, passes through the channel C, and exits the liquid outlet 18.

In the first embodiment, the spoilers 14 each comprise a plurality of fins 141 such that each spoiler 14 and the base 11 are integrally formed. In practice, the base 11 is cut with a machine tool to form the groove 12 and the plurality of fins 141 simultaneously; hence, not only are the plurality of fins 141 integrally formed on the base 11, but the space S is also formed between the cover unit 21 and top ends of the plurality of fins 141. The plurality of fins 141 are slender and extend in the axial direction of the groove 12 and parallel to the axial direction of the groove 12. The plurality of fins 141 are parallel and spaced apart by a predetermined distance. The plurality of fins 141 are located at the longitudinal segments 12S of the groove 12, respectively, and thus divided into sections; hence, adjacent sections of the plurality of fins 141 are separated by one said transverse segment 12T of the groove 12.

The distance between each said fin 141 and each of the two sidewalls 122 is greater than the distance between two adjacent said fins 141. Therefore, the cooling liquid 99 passes through the channel C by passing through the gap between each of the two sidewalls 122 and a corresponding one of the fins 141.

The framework of the first embodiment is described above. The operation of the first embodiment is described below.

Before operating the liquid-cooled cooling device 10 with a channel, it is necessary to connect an inlet pipe (not shown) for the cooling liquid 99 to the liquid inlet 16, connect an outlet pipe (not shown) for the cooling liquid 99 to the liquid outlet 18, and feed the cooling liquid 99 to fill the channel C with the cooling liquid 99. Therefore, as soon as a process of driving the cooling liquid 99 begins, the cooling liquid 99 is introduced into the channel C through the inlet pipe and then exits the outlet pipe. The external inlet pipe and outlet pipe as well as circulation apparatuses are well-known among persons skilled in the art and thus their operations are readily comprehensible; hence, for the sake of conciseness they are not shown in the diagrams.

Figure 4:
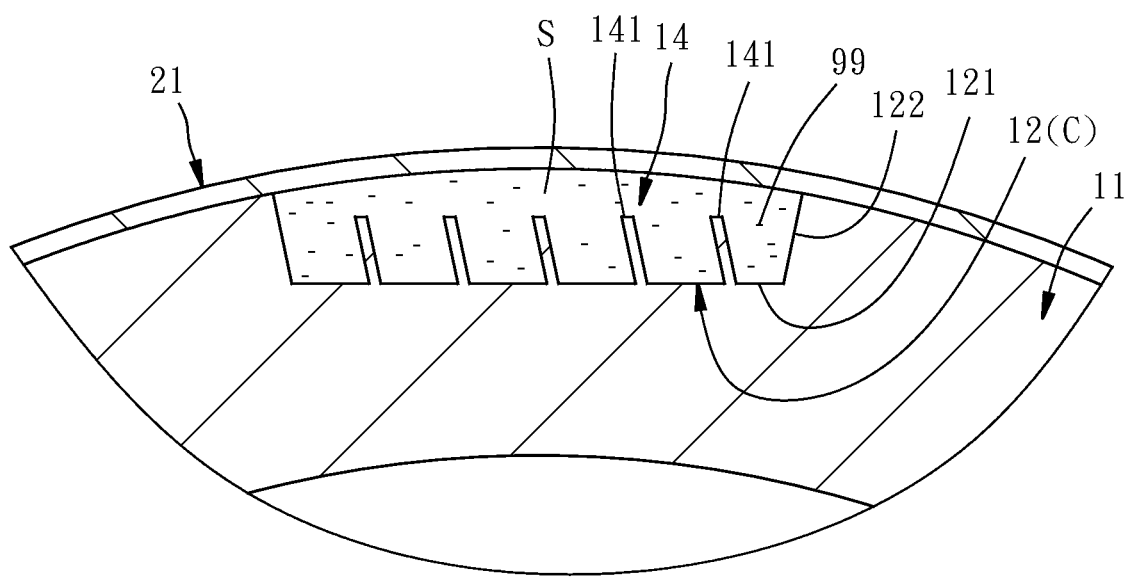
FIG. 4 is a schematic view of how the liquid-cooled cooling device with a channel according to the first preferred embodiment of the present disclosure works.

Referring to FIG. 4, operation of the liquid-cooled cooling device 10 with a channel entails driving the cooling liquid 99 such that it enters the channel C through the liquid inlet 16 continuously and passes the spoilers 14. The subsequent operation of the liquid-cooled cooling device 10 with a channel is hereunder illustrated with the cooling liquid 99 passing one said spoiler 14. To pass one said spoiler 14, the cooling liquid 99 not only passes through the space S above but also passes through the gaps between the plurality of fins 141. With the plurality of fins 141 being disposed on the base 11, heat is transferred from inside the base 11 to the surface thereof to allow the heat to be absorbed by the cooling liquid 99. Since the cross-sectional area of the spaces between the plurality of fins 141 is small, the cooling liquid 99 passes the spoilers 14 slowly and thus absorbs heat from the plurality of fins 141 efficiently. The cooling liquid 99 passes through the space S quickly and thereby help driving an underlying portion of the cooling liquid 99 to pass the spoilers 14. Hence, not only is heat removed from the plurality of fins 141 efficiently, but the cooling liquid 99 also flows and exits the channel C efficiently, thereby enhancing cooling efficiency.

Therefore, in the first embodiment, the spoilers 14 in the channel C are effective in varying the flow of the cooling liquid 99 to enable the cooling liquid 99 to absorb more heat and then remove the heat by the circulation of the cooling liquid 99. In the first embodiment, the spoilers 14 in the channel C increase the contact area between each fin 141 and the cooling liquid 99 such that the heat can be readily absorbed by the cooling liquid 99, and then the heat is removed by the circulation of the cooling liquid 99, thereby enhancing cooling efficiency.

The plurality of fins 141 of the spoilers 14 are of same heights, and could be designed in different heights. The heights of the plurality of fins 141 are designed to increase the contact area between each fin 141 and the cooling liquid 99 and are subject to change as needed. The aforesaid structure is inferable from FIG. 3 and thus is not shown in the diagrams.

Figure 5:
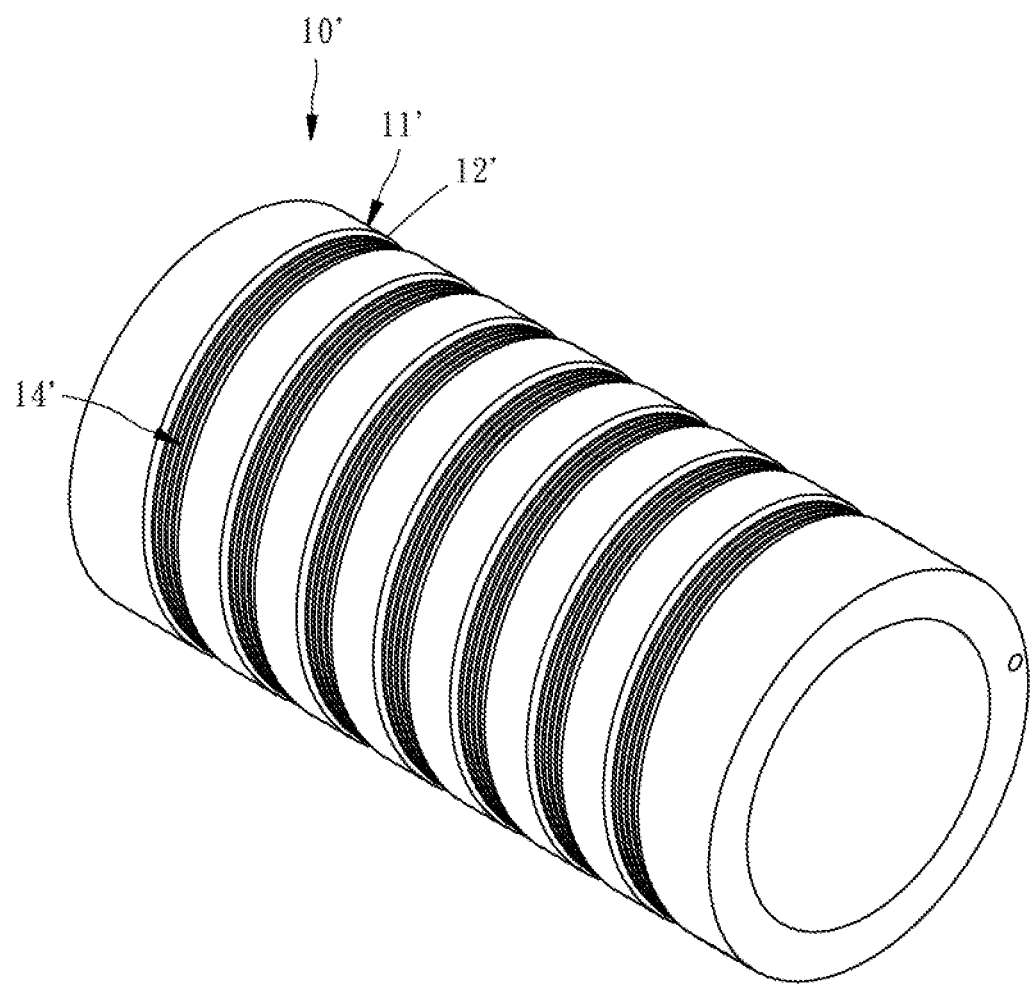
FIG. 5 is a perspective view of a portion of another liquid-cooled cooling device with a channel according to the second preferred embodiment of the present disclosure, showing a base thereof

Referring to FIG. 5, a liquid-cooled cooling device 10' with a channel in the second preferred embodiment of the present disclosure is distinguished from the liquid-cooled cooling device 10 with a channel in the first preferred embodiment of the present disclosure by technical features described below.

The groove 12' extends across the base 11' by following a helical path and thus takes on a helical shape. The spoilers 14' extend from one end of the groove 12' to the other end continuously.

The other structural features, operations and advantages in the second preferred embodiment are substantially the same as those in the first embodiment, but for the sake of conciseness they are not reiterated.

Figure 6:
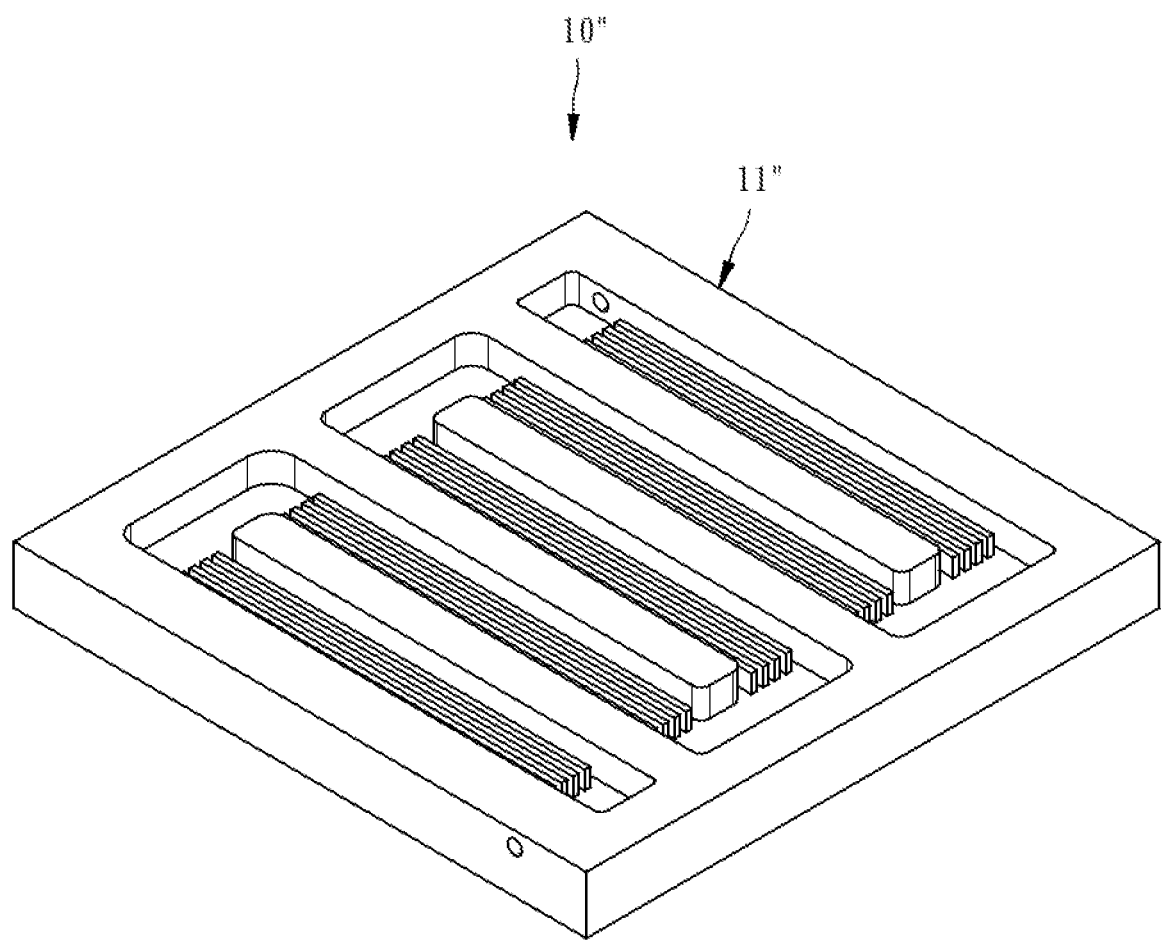
FIG. 6 is a perspective view of a portion of yet another liquid-cooled cooling device with a channel according to the third preferred embodiment of the present disclosure, showing a base thereof.

Referring to FIG. 6, a liquid-cooled cooling device 10" with a channel in the third preferred embodiment of the present disclosure is distinguished from the liquid-cooled cooling device 10 with a channel in the first preferred embodiment of the present disclosure by technical features described below.

The base 11" is exemplified by a panel-shaped structure rather than a driving shaft of a machine tool; hence, the base 11" dissipates heat or cools down a heat source adhered to the base 11" from below.

The other structural features and advantages in the third preferred embodiment are substantially the same as those in the first embodiment, but for the sake of conciseness they are not reiterated.

In the aforesaid three preferred embodiments, the spoilers are exemplified by fins. However, any other types of spoilers, such as ones formed by extending posts upward from the bottom wall of the groove or extending bumps upward from the bottom wall of the groove, are also applicable to the aforesaid three preferred embodiments, but are outperformed by the aforesaid fin-based spoilers in terms of heat dissipation area and smoothness of flow. However, the aforesaid post-based spoilers and bump-based spoilers are still deemed falling into the scope of the appended claims of the present disclosure.

What is claimed is:

1. A liquid-cooled cooling device with a channel, comprising:
   a base, which is a driving shaft of a machine tool, having a surface on which a groove is concavely disposed, with a spoiler disposed on a portion of a wall of the groove and extending for a predetermined length in an axial direction of the groove; and a cover unit, which is a cylindrical tube sleeved onto the surface of the base to cover the groove and thereby form a channel through which a liquid passes, with the channel not completely closed by the spoiler, wherein one of the base and the cover unit has a liquid inlet and a liquid outlet, the liquid inlet being in communication with an end of the channel, and the liquid outlet being in communication with another end of the channel;

wherein the groove extends across the base by following a helical path;

wherein the spoiler comprises a plurality of fins.

2. The liquid-cooled cooling device with a channel according to claim 1, wherein the spoiler and the cover unit are spaced apart by a predetermined distance to form a space.

3. The liquid-cooled cooling device with a channel according to claim 1, wherein the groove has a bottom wall and two sidewalls, with the spoiler disposed on the bottom wall.

4. The liquid-cooled cooling device with a channel according to claim 1, wherein the spoiler and the base are integrally formed.

5. The liquid-cooled cooling device with a channel according to claim 1, wherein the plurality of fins of the spoiler extend in an axial direction of the groove, and are parallel to the axial direction of the groove.

6. The liquid-cooled cooling device with a channel according to claim 5, wherein the plurality of fins of the spoiler are parallel and spaced apart by a predetermined distance.

7. The liquid-cooled cooling device with a channel according to claim 6, wherein the plurality of fins of the spoiler are divided into sections such that adjacent sections of the plurality of fins are spaced apart by a predetermined distance.

8. The liquid-cooled cooling device with a channel according to claim 6, wherein the groove has a bottom wall and two sidewalls, with the spoiler disposed on the bottom wall in such a manner that a distance between the spoiler and each of the two sidewalls is greater than a distance between two adjacent said fins.

9. The liquid-cooled cooling device with a channel according to claim 1, wherein the liquid inlet and the liquid outlet are disposed on the base.

* * * * *